(12) United States Patent
Arthurs et al.

(10) Patent No.: US 7,244,507 B2
(45) Date of Patent: Jul. 17, 2007

(54) SILICONE-FREE MULTILAYER SHRINK FILM FOR HIGH SPEED PACKAGING LINES

(75) Inventors: Trevor Arthurs, Truro (CA); Shane Taghavi, Truro (CA)

(73) Assignee: Intertape Polymer Corp., Bradenton, FL (US)

( * ) Notice: Subject to any disclaimer, the term of this patent is extended or adjusted under 35 U.S.C. 154(b) by 138 days.

(21) Appl. No.: 11/091,028

(22) Filed: Mar. 28, 2005

(65) Prior Publication Data

US 2005/0214557 A1     Sep. 29, 2005

Related U.S. Application Data

(60) Provisional application No. 60/557,019, filed on Mar. 26, 2004.

(51) Int. Cl.
  *B32B 27/32* (2006.01)
(52) U.S. Cl. .................. 428/516; 428/520; 428/910
(58) Field of Classification Search ........... 428/516, 428/520, 910
  See application file for complete search history.

(56) References Cited

U.S. PATENT DOCUMENTS

| | | | |
|---|---|---|---|
| 3,555,604 A | 1/1971 | Pahlke | |
| 4,079,328 A | 3/1978 | Cleland et al. | |
| 4,597,920 A | 7/1986 | Golike | |
| 4,692,380 A | 9/1987 | Reid | |
| 4,963,419 A | 10/1990 | Lustig et al. | |
| 4,976,898 A | 12/1990 | Lustig et al. | |
| 5,089,321 A | 2/1992 | Chum et al. | |
| 5,298,302 A | 3/1994 | Boice | |
| 5,556,920 A * | 9/1996 | Tanaka et al. | 525/216 |
| 5,632,843 A | 5/1997 | Lustig et al. | |
| 6,207,093 B1 | 3/2001 | Hanyu et al. | |
| 6,291,063 B1 | 9/2001 | Shah et al. | |
| 6,489,016 B2 * | 12/2002 | Kishine | 428/213 |
| 2004/0067382 A1* | 4/2004 | Niepelt | 428/515 |

FOREIGN PATENT DOCUMENTS

| | | | |
|---|---|---|---|
| DE | 102 36 502 | * | 3/2004 |
| EP | 1 300 238 A2 | * | 9/2002 |
| JP | 55078038 | * | 6/1980 |
| JP | 2004-25458 | * | 1/2004 |
| WO | WO 02/38383 | * | 5/2002 |

OTHER PUBLICATIONS

TICONA LLC, "Topas®: Thermoplastic Olefin Polymer of Amorphous Structure (COC)" [product brochure], 2004.

* cited by examiner

*Primary Examiner*—D. Lawrence Tarazano
(74) *Attorney, Agent, or Firm*—Roberts Mardula & Wertheim

(57) ABSTRACT

Multilayer shrink films and methods of making same that are substantially free of silicone. The multilayer shrink films of the invention are produced using film biaxial orienting means, have haze values of 5 or less and Young's modulus of 40,000 psi or greater and superior hot slip properties. Cyclic-olefin copolymer (COC) is used in the outermost layers to impart superior hot slip. Preferably the film comprises large proportion of linear low density polyethylene (LLDPE) or ethylene propylene butane terpolymer. Suitable COCs for use in the invention are limited to single site catalyzed COC.

21 Claims, 3 Drawing Sheets

SILICONE-FREE MULTILAYER SHRINK FILM FOR HIGH SPEED PACKAGING LINES

This application claims priority under 35 U.S.C. §119 from U.S. provisional patent application Ser. No. 60/557,019, filed Mar. 26, 2004, of the same inventors, which is incorporated by reference in its entirety.

BACKGROUND OF THE INVENTION

The present invention relates to polyolefin films and biaxially oriented films with improved properties useable as shrink films. In particular, the present invention relates to shrink film for use in packaging lines, although the invention may also be used in other shrink film applications.

Polyolefins, polyvinyl chlorides, ionomers, polyesters, polystyrenes, and polyvinylidene chlorides have all been used in the production of shrink film. The shrinkable polyolefins currently on the market include both cross-linked and non cross-linked oriented polyethylene, oriented polypropylene, and oriented ethylene-propylene copolymers.

A shrink film's distinguishing characteristic is its ability upon exposure to heat to either shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, damage due to handling and shipment, dirt and contamination.

Typical items wrapped in polyolefin shrink films are toys, games, sporting goods, stationery, greeting cards, hardware and household products, office supplies and forms, foods, phonograph records, and industrial parts.

The manufacture of shrink films requires sophisticated equipment including extrusion lines with "biaxial orientation" capability. Biaxial orientation can be accomplished with "tenter frame" stretching or "double bubble" blown film extrusion processes. The biaxial orientation causes the material to be stretched in the cross or transverse direction and in the longitudinal or machine direction. The films are usually heated to their orientation temperature range that varies with the different polymers but is usually above room temperature and below the polymer's melting temperature. After being stretched, the film is rapidly cooled to quench it thus freezing the molecules of the film in their oriented state. Upon heating, the orientation stresses are released and the film will begin to shrink back to its original unoriented dimension.

The polyolefin family of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to break), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions).

In addition to the above, high speed automatic wrapping lines require that the shrink film have high film-film slip (low coefficient of friction), consistently strong static seals and higher stiffness compared to other shrink films. The strong static seals allow for fast sealing of the packages. Higher stiffness supports high film and packaging line speeds. Stiffness is measured as Young's modulus or "modulus" per ASTM test D 882.

High slip allows packages to freely pass one another on conveyors without sticking or clinging. Slip may be determined at room temperature or at elevated temperatures. Slip at room temperature is representative of conditions packaged goods encounter during transportation between facilities and during loading and off-loading of packages from transport vehicles.

Packages having high slip at room temperature may still have poor hot slip characteristics. Hot slip is important for operating packaging lines at high speeds. One determinant in line speed is the amount of time required to cool the packages downstream of the shrink oven or chamber. Packages must be cooled to a point where they no longer cling to other packages. For this reason, packages with superior hot slip require less cooling time and therefore allow faster packaging line speeds.

One example of a commercially successful polyethylenic based shrink film requires a silicone anti-block agent to provide sufficient hot slip. In this product, approximately 0.4% of the outer layers comprises spherical silicone (10% concentration in a LLDPE based master batch blend).

Propylene copolymers and silicon oils have been used to enhance film hot slip characteristics. For example, U.S. Pat. No. 5,298,302 to Boice uses skin layers comprising a propylene polymer or copolymer with butene or polybutylene. Such films often have limited tear propagation resistance. U.S. Pat. No. 6,291,063 to Shah et al. uses silicon oil in the form of organosiloxane in the outer film layers to improve hot slip.

The use of silicon compounds is undesirable due to public association with silicone toxicity. In addition, silicone migration or volatilization is problematic for silicone-sensitive end uses, such as in the microelectronics and automotive coatings industries. Further the use of silicones can cause printing problems such as poor adhesion or non-wetting of the ink.

Ticona manufactures cyclic-olefin copolymers (COC) and has found them helpful in cast films comprising low density polyethylene. Such films are often used as stretch films and are not the biaxially oriented shrink films of the present invention. Further, recommendations from Ticona indicate that COCs having a glass transition temperature within 100-104 degrees Celsius of the film extruder temperature must be selected. Surprisingly the inventors have been able to achieve superior hot slip in LLDPE and polypropylene terpolymer shrink films by employing COCs with glass transition temperatures 152 degrees Celsius below the extruder processing temperature.

Accordingly, it is a general object of the present invention to provide shrinkable films having improved properties for high speed packaging lines with superior hot slip characteristics and essentially silicone free surfaces.

BRIEF SUMMARY OF THE INVENTION

The objects of this invention are multilayer shrink films and methods of making same. In particular the essentially silicone-free multilayer shrink films comprise 1.2% to 4.5% cyclic-olefin copolymer (4% to 30% of the outer layers), achieve a modulus of about 40,000 psi or greater and a haze value of 5 or less and superior hot slip properties. The multilayer shrink films of the invention are produced using biaxial orientation. Preferred biaxial orientation methods include double-bubble or tenter-frame biaxial orienting processes. In an optional method for crosslinking layers, a collapsed tube or final film of a double bubble biaxial orientation process is exposed to electromagnetic radiation.

In one embodiment, the present invention relates to a multilayer shrink film for high speed packaging lines having a modulus of about 40,000 psi or higher, a haze value less than 5.0, and a superior hot slip rating. The multilayer shrink film has first and second outer high speed polyethylenic layers and one or more inner polyethylenic layers. Each outer high speed ethylenic layer comprises by weight 60% to 85% linear low density polyethylene, 5% to 15% ethylene vinyl acetate copolymer, and 3% to 15% cyclic-olefin copolymer. The cyclic olefin copolymer of the multilayer shrink film is a single-site catalyzed cyclic-olefin copolymer and comprises by weight 1% to 4.5% of the five layer shrink film. The multilayer shrink film comprises less than 1% by weight polystyrene and less than 1% polypropylene. The ethylenic layers have substantially silicone free surfaces. The multi-layer shrink film further has a hot slip rating of 4.5 or higher.

In an alternative embodiment, the present invention relates to a multilayer shrink film for high speed packaging lines having a modulus of 40,000 psi or higher, a haze value less than 5.0, and a superior hot slip rating or 4.5 or higher. The multilayer shrink film has first and second outer polypropylenic layers and one or more inner polyethylenic layers. Each of the polypropylenic layers comprises by weight 70% to 96% polypropylene and 4% to 30% cyclic-olefin copolymer. The cyclic-olefin copolymer of the multilayer shrink film is a single-site catalyzed cyclic olefin copolymer and comprises by total weight 1% to 4.5% of the five layer shrink film. The high speed polypropylenic layers have substantially silicone free surfaces. The multi-layer shrink film further has a hot slip rating of 4.5 or higher.

In yet another embodiment, the present invention relates to a multilayer shrink film for high speed packaging lines having first and second skin layers, a core layer, and first and second tie layers. The skin layers include by weight 62%-88% polypropylenic polymer, 2%-8% slip agent, and 10%-30% cyclic-olefin copolymer. The core layer includes by weight 0-70% linear low density polyethylene, 30%-98% very low density polyethylene, and 2%-8% slip agent. The tie layers include by weight 0-35% linear low density polyethylene, 20%-70% very low density polyethylene, 15%-50% ethylene vinyl acetate copolymer, and 2%-8% slip agent. The multilayer shrink film has a hot slip rating of 4.5 or higher, a modulus of at least 40,000 psi, and a haze value less than 5.0.

DETAILED DESCRIPTION OF THE INVENTION

Figure 1:
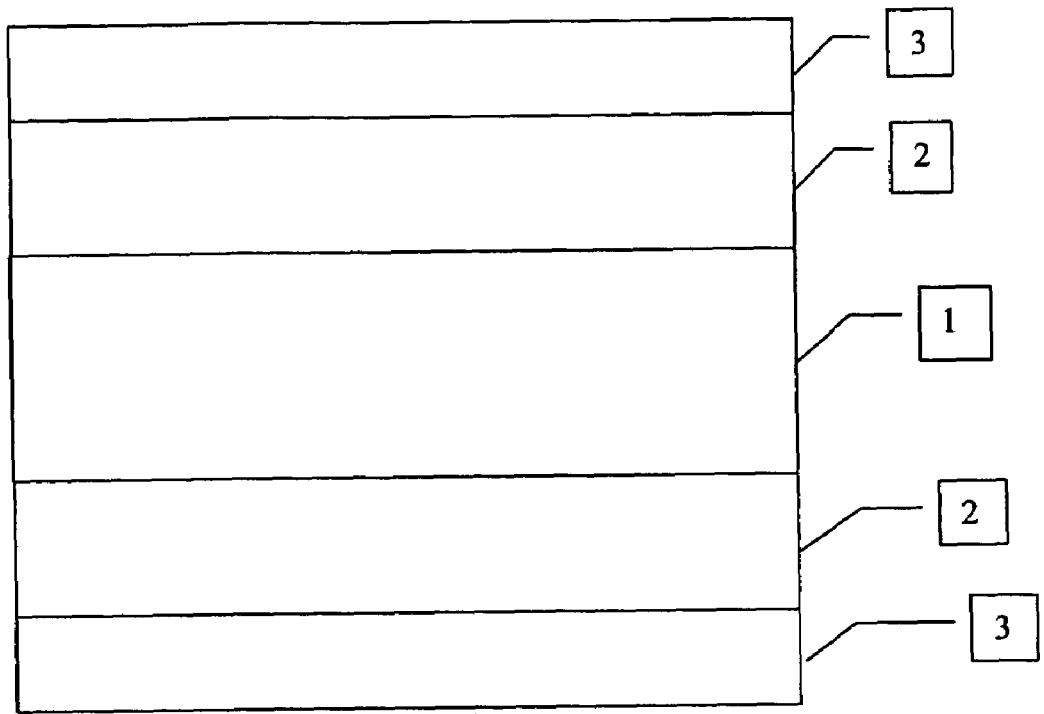
FIG. 1 illustrates a sectional view of one embodiment of the invention having a cyclic-olefin copolymer inner layer, two intermediate layers and two outer layers.

The present invention is directed toward multilayer shrink films suitable for use in high speed packaging lines.

In a first embodiment, the present invention relates to a multilayer shrink film for high speed packaging lines having a modulus of 40,000 psi or higher, a haze value less than 5.0, and a superior hot slip rating. The multilayer shrink film has first and second outer high speed polyethylenic layers and one or more inner polyethylenic layers. Each outer high speed ethylenic layer comprises by weight 60% to 85% linear low density polyethylene, 5% to 15% ethylene vinyl acetate copolymer, and 3% to 15% cyclic-olefin copolymer. The cyclic olefin copolymer of the multilayer shrink film is a single-site catalyzed cyclic-olefin copolymer and comprises by weight 1% to 4.5% of the five layer shrink film. The multilayer shrink film comprises less than 1% by weight polystyrene and less than 1% polypropylene. The ethylenic layers have substantially silicone free surfaces. The multilayer shrink film further has a hot slip rating of 4.5 or higher.

In accordance with an embodiment of the present invention, the linear low density polyethylene copolymer may include by weight 1% to 10% 1-octene monomer. The multilayer shrink film may have a thickness of between 0.4 and 3.0 mils. In one version of the first embodiment, the first polyethylenic layer may comprise 5% to 20% of the total weight of the film and the second polyethylenic layer may comprise 5% to 20% of the total weight of the film. The film may be crosslinked using a radiation source. The radiation source may be active on the first collapsed tube of a double-bubble film orientation process or on the film subsequent to full biaxial orientation. In another version of this embodiment, the high speed ethylenic layers comprise by weight 80%-86% linear low density polyethylene, 8-12% ethylene vinyl acetate copolymer, and 4-6% cyclic olefin copolymer, and 1.0-1.4% slica master batch containing 10% silica in 90% LLDPE, and the polyethylenic layers include 92%-98% linear low density polyethylene and 2%-8% slip master batch containing including 6.5% erucimide in 93.5% LLDPE. In still another version of this embodiment, the ethylenic layers include by weight 83.7% linear low density polyethylene, 10% ethylene vinyl acetate copolymer, and 5% cyclic olefin copolymer, and 1.3% silica master batch containing 10% silica in 90% LLDPE, and the polyethylenic layers include by weight 94% linear low density polyethylene and 6% slip master batch containing 6.5% erucimide in 93.5% LLDPE.

In another embodiment, the present invention relates to a multilayer shrink film for high speed packaging lines having a modulus of 40,000 psi or higher, a haze value less than 5.0, and a superior hot slip rating or 4.5 or higher. The multilayer shrink film has first and second outer polypropylenic layers and one or more inner polyethylenic layers. Each of the polypropylenic layers comprises by weight 70% to 96% polypropylene and 4% to 30% cyclic-olefin copolymer. The cyclic-olefin copolymer of the multilayer shrink film is a single-site catalyzed cyclic olefin copolymer and comprises by total weight 1% to 4.5% of the five layer shrink film. The high speed polypropylenic layers have substantially silicone free surfaces. The multi-layer shrink film further has a hot slip rating of 4.5 or higher.

In accordance with an embodiment of the present invention, the multilayer shrink film may have a thickness between 0.4 and 2.0 mils. In one version of this embodiment, the first outer polypropylenic layer includes from 5% to 20% of the total weight of the film and the second outer polypropylenic layer comprises from 5% to 20% of the total weight of the film.

In another embodiment, the present invention relates to a multilayer shrink film for high speed packaging lines having first and second skin layers, a core layer, and first and second tie layers. The skin layers include by weight 62%-88% polypropylenic polymer, 2%-8% slip agent, and 10%-30% cyclic-olefin copolymer. The core layer includes by weight 0-70% linear low density polyethylene, 30%-98% very low density polyethylene, and 2%-8% slip agent. The tie layers include by weight 0-35% linear low density polyethylene, 20%-70% very low density polyethylene, 15%-50% ethylene vinyl acetate copolymer, and 2%-8% slip agent. The multilayer shrink film has a hot slip rating of 4.5 or higher, a modulus of at least 40,000 psi, and a haze value less than 5.0.

In accordance with an embodiment of the present invention, the cyclic olefin copolymer has a glass transition temperature of 68° C.-80° C. In one version of this embodiment, the skin layer includes by weight 70%-75% polypropylenic polymer, 4%-6% slip agent, and 20%-24% cyclic olefin copolymer, the core layer includes by weight 50%-60% linear low density polyethylene, 36%44% very low density polyethylene, and 4%-6% slip agent, and the tie layer includes by weight 22%-28% linear low density polyethylene, 36%-44% very low density polyethylene, and 4%-6% slip agent. In another version of this embodiment the skin layer includes 73% polypropylenic polymer, 5% slip agent, and 22% cyclic-olefin copolymer. In yet another version of this embodiment, the core layer includes 54.5% linear low density polyethylene, 40% very low density polyethylene, and 5.5% slip agent. In still another version of this embodiment the tie layer includes by weight 25% linear low density polyethylene, 40% very low density polyethylene, 30% ethylene vinyl acetate copolymer, and 5% slip agent.

FIG. 1 illustrates a sectional view of preferred embodiments of the invention. The present invention comprises a high speed multilayer shrink film comprising two high speed polyethylenic or polypropylenic outer layers 3 and at least one innermost polyethylenic layer 1. The films of the present invention may also comprise one or more layer(s) 2. When intermediate layers 2, are present the shrink film is a five layer film. When not present, the resultant film is a three layer film.

The embodiment of FIG. 1 allows for the use of varying amounts of additives in the various inner layers, for example, UV inhibitors, pigments, metallic pigments, and the like. Intermediate layers 3 of FIG. 1 may otherwise consist of polymer blends and additives similar or equal in composition to innermost layer 1.

The essentially silicone free multilayer shrink films of the present invention will have each outermost layer 2 comprising 5%-20% by weight of the film (e.g. 10%-40% by weight for two outermost layers). When used in a five layer film (e.g. FIG. 1), innermost layer 1 will comprise 30-60% by weight of the film and each other intermediate inner layer 3 will comprise 10-20% by weight. For example, a five layer film may have 40% innermost layer, 15% each outermost layer and 15% each remaining inner layer.

As used herein "substantially silicone free" refers to embodiments comprising less than 20 ppm silicone and/or organosiloxane. As used herein "substantially silicone free surface" refers to a surface of a film that when analyzed using photoelectron spectroscopy (XPS) does not show significant peaks at silicon binding energies. Following review of XPS testing of polymer surfaces, it was found that peaks are normally not significant if the silicon is below 0.2 atomic %. As a result, substantially silicone free surface is estimated as having less than 0.2 atomic % silicon present in the form of silicone or organosiloxane.

As used herein "polyethylenic polymer" refers to ethylenic homopolymer and copolymers that comprise a major proportion by weight of ethylene copolymerized with a minor proportion by weight of an α-olefin monomer containing about 3 to about 12, preferably about 4 to about 10, and more preferably about 4 to about 8, carbon atoms. As used herein polyethylenic polymers do not include propylene copolymers with a propylene content greater than 50% by weight.

Polyethylenic copolymers include those commonly referred to as high density polyethylene (HDPE), low density polyethylene (LDPE), linear low density polyethylene (LLDPE), and very low density polyethylene (VLDPE). Preferably the ethylenic copolymers employed are those having from about 1 to about 20, preferably from about 1 to about 10 weight percent of said higher α-olefin monomer copolymerized therein. In addition, the α-olefin monomer employed in the ethylenic copolymer is preferably selected from the group consisting of 1-butene, 3-methyl-1-butene, 3-methyl-1-pentene, 1-hexene, 4-methyl-1-pentene, 3-methyl-1-hexene, 1-octene and 1-decene. Particularly preferred are the 1-octene α-olefins.

LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

High density polyethylene (HDPE) refers to a homopolymer of ethylene or a copolymer of a major portion by weight of ethylene with one or more α-olefins, the homopolymer or copolymer having a density greater than 0.940 g/cm$^3$, and a melting point between 125° C. and 140° C.

Low density polyethylene (LDPE) refers to a highly branched homopolymer of ethylene having a density between 0.915 and 0.930 g/cm$^3$, typically having long branches off the main backbone chain with alkyl substituents of 2 to 8 carbon atoms on these branches.

Very low density polyethylene (VLDPE) refers to a copolymer of a major portion by weight of ethylene with one or more α-olefins, the copolymer having a density greater than 0.86 and less than 0.915 g/cm$^3$, a melting point between 85° C. and 125° C., and a Vicat Softening Point (VSP) greater than 60° C. Very low density polyethylene (VLDPE) sometimes is also referred to as ultra low density polyethylene (ULDPE).

Linear low density polyethylene (LLDPE) refers to a copolymer of a major portion by weight of ethylene with one or more α-olefins, the copolymer having a density of at least 0.915 g/cm$^3$, a melting point between 115° C. and 130° C., and a Vicat Softening Point (VSP) greater than 60° C.

As used herein "high speed polyethylenic outer layer" refers to an outer layer of a multilayer film comprising 60% or more by weight polyethylenic polymer that has been formulated for use as outer layers in high speed packaging shrink film and further comprises 5% to 15% by weight ethylene vinyl acetate copolymer and 5% to 30% by weight cyclic-olefin copolymers. Suitable polyethylenic polymers include film grade polyethylenic polymer. Such polymers typically have a melt flow index of 0.5 to 5.0. Film grade polyethylenic polymers are available commercially from Nova Chemicals, Dow Chemical, Exxon, Union Carbide, Equistar, Mobil and Chevron. Particularly preferred are the LLDPE film grade polyethylenic polymers. Formulations in high speed polyethylenic outer layers provide for film-film slip, low haze, and scratch resistance.

As used herein "high speed polypropylenic outer layer" refers to an outer layer of a multilayer film comprising 80% or more by weight polypropylenic polymer, copolymer or terpolymer that has been formulated for use as outer layers in high speed packaging shrink film. Suitable polypropylenic polymers include film grade polypropylenic polymers, including homopolymers, copolymers and terpolymers. Such polymers, copolymers and terpolymers typically have a melt flow rate of 0.5 to 5.0. Film grade polypropylenic polymers are available commercially, for example, from Basell, Atofina, BP Amoco and Toray. Particularly preferred are the film grade terpolymers, for example Adsyl™ ethylene-propylene-butane terpolymer available from Basell. Formulations in high speed polyethylenic outer layers provide for film-film slip, low haze, and scratch resistance.

As used herein, "ethylene vinyl acetate copolymer" (EVA) refers to a copolymer formed from ethylene and vinyl acetate monomers wherein the ethylene derived units (monomer units) in the copolymer are present in major amounts (by weight) and the vinyl acetate derived units (monomer units) in the copolymer are present in minor, by weight, amounts. Film grade EVA is available commercially from AT Plastics, Dow Chemical, DuPont, Huntsman and Chevron.

As used herein, "cyclic-olefin copolymers" (COCs) refer to copolymers built up from cyclic-olefins and comonomers, where the comonomer content is at most 20% by weight, based on the weight of the cyclic-olefin polymer (preferably 1-15% by weight, and most preferably 1-8% by weight). Cyclic-olefins are mono- or polyunsaturated polycyclic ring systems, such as cycloalkenes, bicycloalkenes, tricycloalkenes or tetracycloalkenes. The ring systems can be mono-substituted or polysubstituted. Particularly preferred cyclic-olefins are polynorbornene, polydimethyloctahydronaphthalene, polycyclopentene and poly(5-methyl)-norbornene. Particularly preferred for the invention are non-polar fully amorphous COCs, for example, those formed by polymerizing 2-norbornene with ethylene in presence of a single site catalyst (e.g. metallocene catalyst).

Selection of a suitable COC resin for the present invention will depend upon the producer of the COC as well the film manufacturing process employed. In general, film grade COCs produced using single site catalysts are usable. Particularly preferred are such COCs having a glass transition temperature ($T_g$) from 60° C. to 75° C. In contrast to COC producer recommendations, the inventors have surprisingly found that such COCs can be used for shrink film manufacturing at temperature of 220° C. (manufacturer recommendation is maximum of 100-104° C. above the glass transition temperature or 160-174° C.).

The films of the present invention may be formed by any method known in the art of forming shrink films. Such methods normally consist of biaxially orientation processing equipment. In general, shrink film production can be of any suitable technique including the use of tenter frames and double bubble film processing. The double-bubble process is often referred to as the process described in U.S. Pat. No. 3,555,604 to Pahlke. U.S. Pat. No. 3,555,604 is incorporated herein by reference.

Figure 2:
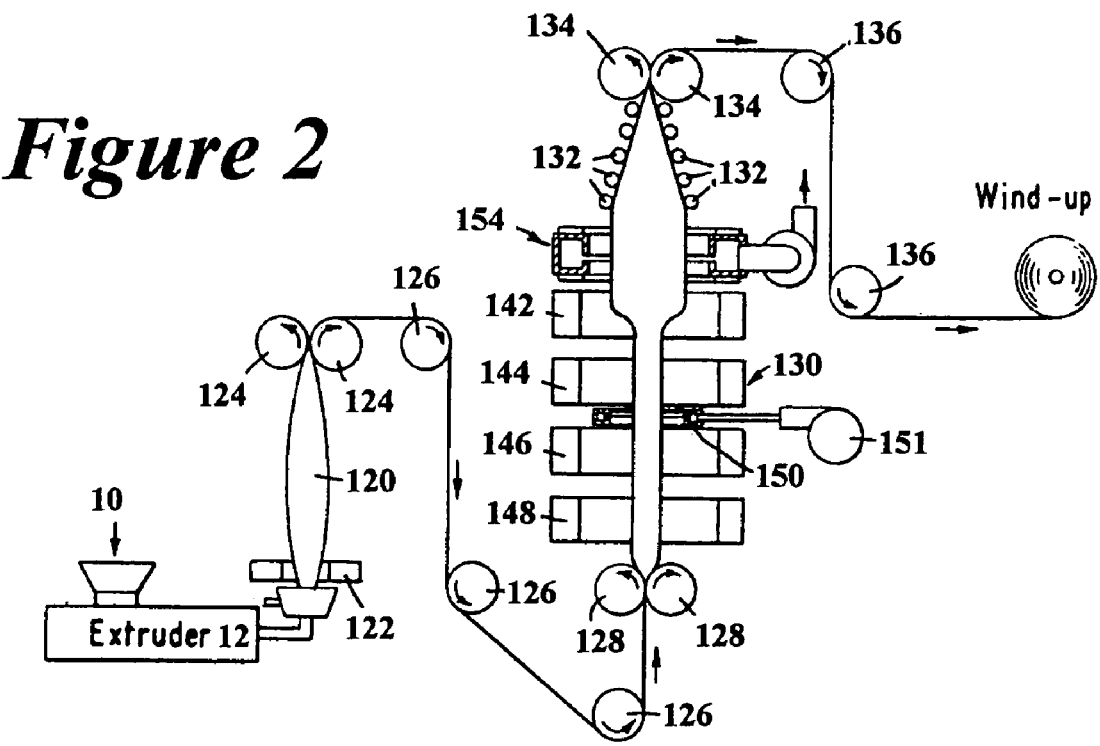
FIG. 2 illustrates a double-bubble process for producing biaxially oriented films.

FIG. 2 illustrates the major components of such a double bubble processing line. The plastic feedstock 10 is fed into extruder 12. A primary bubble 120 forms by inflating the bubble as the melt exits die 122. Primary bubble 120 is cooled and collapsed as it passes through rollers 124. The resulting collapsed tube is then re-inflated to form the second bubble. The second bubble is heated to its draw temperature by means of external heaters 148, 146, 144, and 142. The amount of inflation determines the degree of orientation in the transverse direction. Machine direction orientation is imparted by having speed of the exit rollers 134 greater than the inlet rollers 128.

Features required to properly control the double-bubble process are further described in the Pahlke patent. Such features include special design of extruder die 122, air cooling areas 151 and 154 and guide rollers 132.

For the most part the double-bubble process results in a biaxially oriented film that is simultaneously oriented in both the machine and transverse directions. This is in contrast to the tenter frame processing line where first machine direction orientation is followed by transverse (tenter direction) orientation.

During processing of multilayer polyolefin films, it is often desirable to further enhance the film properties by crosslinking the layers of the film. An exemplary method of crosslinking is the exposure of the film to electromagnetic radiation. In the double bubble process, the irradiating equipment may be situated so as to irradiate the collapsed tube (i.e. between rollers 124 and rollers 128 of FIG. 2) or the final film (i.e. after rollers 134 of FIG. 2).

Cross-linking is achieved either chemically or by the use of irradiation. The benefits of cross-linking include changing thermoplastic materials to improve properties in multi-layer film applications. In multi-layer films, the molecules in these materials tend to slip and slide over one another. As temperature rises, these uncross-linked materials soften and finally melt. Cross-linking severely impedes molecular movement and provides greater stability against heat. The locking together of molecules is the origin of the benefits of cross-linking, which include increase tensile strength, increased form stability, resistance to deformation, resistance to abrasion, resistance to solvents, improved shrink memory, resistance to slipping of layers, and resistance to stress cracking.

Irradiation may he accomplished by the use of high energy electrons, ultra violet radiation, X-rays, gamma rays, beta particles, and the like. Preferably, electrons are employed up to about 20 megarads (Mrad) dosage level. The irradiation source can be any electron beam generator operating in a range of about 150 kilovolts to about 6 megavolts with a power output capable of supplying the desired dosage. The voltage can be adjusted to appropriate desired levels. Many apparatus for irradiating films are known to those of skill in the art. The chemical effect of electron beam irradiation varies greatly based on the amount of electron energy or dose that a product receives.

A radiation dose is measured in terms of the amount of radiation energy absorbed per unit mass of the material. The traditional unit of dose is the RAD, defined as the absorption of 100 Ergs of energy per gram of material. The Mrad (one million rad) is the practical unit. The S.I. unit is the Gray, defined as the absorption of one Joule of energy per kilogram of material. The Kgray (one thousand gray) is the practical unit. One gray equals 100 rads. 10 Kgray equals one Mrad. The irradiation is usually carried out at a dosage up to about 20 Mrad, typically between about 1 Mrad and about 20 Mrad, with a preferred dosage range of about 2 to about 12 Mrad. Irradiation can be carried out conveniently at room temperature, although higher and lower temperatures, for example, 0° C. to 60° C. may be employed.

Irradiation crosslinking is also useful for increasing the shrink temperature range and the heat seal range for the film structures. For example, U.S. Pat. No. 5,089,321, incorporated herein by reference, discloses multilayer film structures comprising at least one heat sealable outer layer and at least one core layer that have good irradiation crosslinking performance. Among irradiation crosslinking technologies, beta irradiation by electron beam sources and gamma irradiation by a radioactive element such as Cobalt 60 are the most common methods of crosslinking film materials.

U.S. Pat. No. 4,079,328 to Cleland et al. relates to an apparatus for thin film electron beam irradiation. U.S. Pat. No. 4,976,898 to Lustig et al. teaches the utilization of irradiation from 1 to 5 Mrad to provide improved heat sealing properties. U.S. Pat. No. 5,632,843 to Lustig et al. teaches the utilization of irradiation to cross-link multi-layer plastic films. U.S. Pat. No. 4,963,419 to Lustig et al. teaches the utilization of irradiation to improve the physical properties of plastic film. U.S. Pat. No. 4,597,920 to Golike discloses the effects and degrees of irradiation cross-linking at various stages of film making operations. The disclosures of these references are incorporated by reference with respect to irradiation methods and limitations in film manufacturing. These patents teach the use of irradiation crosslinking to improve properties of film layers and also to promote adhesion between layers in multi-layer films.

An example of the use of tenter frames is disclosed in U.S. Pat. No. 6,207,093 to Hanyu et al. As described in the Hanyu et al. patent, the entire disclosure of which is incorporated herein by reference, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions.

The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as a surface treatment (for example corona treatment or flame treatment). The film may also be metallized as described in U.S. Pat. No. 4,692,380 to Reid. While corona and flame treatment typically occurs immediately following orientation and prior to the initial roll up, metallizing is typically performed at a separate time and location.

Figure 3:
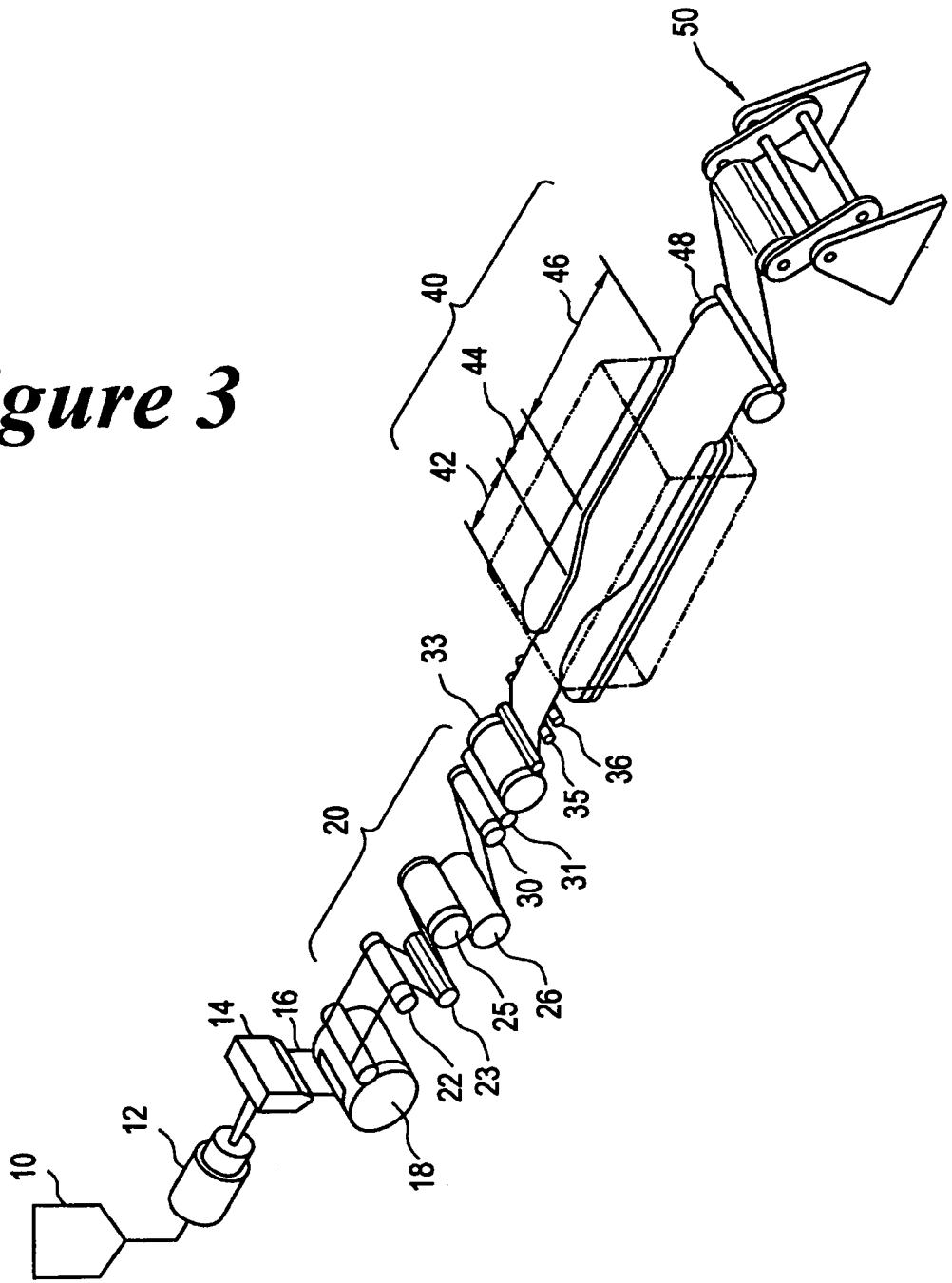
FIG. 3 illustrates a tenter-frame process for producing biaxially oriented films.

FIG. 3 illustrates the apparatus described in the Hanyu et al. patent that may be employed in producing biaxially-oriented polyolefin film in accordance with the present invention. In FIG. 3, a source of molten polymer is supplied from a heated hopper 10 to an extruder 12 and from there to a slot die 14 which produces a flat, relatively thick film 16 at its output. Film 16 is applied over a chill roller 18, and it is cooled to a suitable temperature. The film is drawn off the chill roller 18 to a stretching section 20 to which the machine direction orientation occurs by means of idler rollers 22 and 23 that lead to preheat rollers 25 and 26.

As the film is drawn off the chill roller 18 and passed over the idler rollers, it is cooled to a temperature of about 30-60° C. In stretching the film in the machine direction, it is heated by preheat rollers 25 and 26 to an incremental temperature increase of about 60-100° C. and is oriented by fast roller 31 operating at a suitable speed greater than that of the preheat rollers in order to orient the film in the machine direction.

As the oriented film is withdrawn from the fast roller 31, it is passed over a roller 33 at room temperature conditions. From here it is passed over rollers to a lateral stretching section 40 where the film is oriented by stretching in the transverse direction. The section 40 includes a preheat section 42 comprising a plurality of tandem heating rollers (not shown) where it is reheated to a temperature within the range of 130-180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. The concluding portion of the lateral stretching phase includes an annealing section 46, such as an oven housing, where the film is heated at a temperature within the range of 130-170° C. for a suitable period in time. The annealing time helps control certain properties, and increased annealing is often specifically used to reduce shrinkage.

The biaxially oriented film is then withdrawn from the tenter frame and passed over a chill roller 48 where it is reduced to a temperature of less than about 50° C. and then applied to take-up spools on a take-up mechanism 50. Typically, the initial orientation in the machine direction is carried out at a somewhat lower temperature than the orientation in the lateral dimension. For example, the film may be stretched in the machine direction at a temperature of about 120° C. and stretched in the lateral dimension at a temperature of 160° C.

Various properties are used to measure the performance of polyolefin compositions and films made therefrom. Described below are some of the methods used.

Tensile Strength: The tensile strength including stress and elongation at break were measured for samples of produced film by ASTM method D882. Test speed was 2 inch/minute and a jaw separation of 4". ASTM method D882 was similarly used to measure tangent modulus, peak stress, energy to peak load and % elongation at peak. For the latter measurements a test speed of 0.4 inch/minute and a jaw separation of 4" were used.

Optical properties were determined on samples stretched to an average thickness of 0.6 mils (15 μm). Optical properties include haze, transmittance and gloss. Haze and luminous transmittance were determined in accordance with ASTM D1003. In general, lower haze films will have higher transmittance. Specular gloss was measured generally in accordance with ASTM D2457. ASTM D2457 refers to measurements at 20, 45 and 65 degrees.

Slip and hot slip refer to the tendency of packages to cling to each other. Coefficient of friction (COF) is one measure of cold slip. As used herein, hot slip is a qualitative measure of package-package cling for packages exiting a hot air shrink tunnel. Higher hot slip refers to lower package-package cling. Conversely, low hot slip refers to higher package-package cling. As used herein hot slip is determined at a temperature of approximately from 50 to 60° Celsius.

The invention is illustrated, but not limited by the following examples:

EXAMPLES

Early attempts at preparing the biaxially oriented films of the present invention using cyclic-olefin copolymers (COCs) were unsuccessful. Problems encountered were maintaining the second bubble of a double-bubble processing line. In general early COCs, manufactured with Ziegler-Natta catalysts had too high of glass transition temperature and yielded films having inferior haze values. These limitations have been overcome with recent advances in the manufacture of COCs. All of the inventive examples utilize metallocene catalyzed COCs (when present) with a glass transition temperature below 80° C. and a melt flow rate of approximately 1.0 at 190° C. For example, Ticona 9506 Topas™ brand COC has a glass transition temperature of about 68° C. and Ticona 8007 Topas™ has a glass transition temperature of about 75° C. Both Ticona 9506 Topas™ and Ticona 8007 Topas™ are suitable for the present invention.

COCs having the combination of properties provided in Table 1 below are particularly useful in various embodiments of the present invention.

Suitable LLDPE materials used in the examples include those having a melt index between 0.4 to 2.8 g/10 minutes and a density between 0.915 and 0.922 g/cc. Such LLDPE products are available from various vendors including products sold by Huntsman Corporation such as L 8155, by Dow Chemical such as Dowlex NG 3347A or Tuflin® HS-7002, by Nova Chemicals, by ExxonMobil Chemical, as well as others. LLDPE materials including the combination of properties listed in Table 2 below are particularly useful in various embodiments of the present invention

TABLE 2

| Property | Value | Unit | ASTM Test Method |
|---|---|---|---|
| Melt Index | 0.8 | g/10 minutes | D1238 |
| Density | 0.921 | g/cm$^3$ | D 1505 |
| Haze | 11 | % | D 1003 |
| Gloss at 45° | 60 | | D 523 |
| Dart Impact | 190 | g | D 1709 |
| Elmendorf Tear | | | |
| MD | 300 | | D1922 |
| TD | 550 | | |
| Tensile at Break | | | |
| MD | 41 | MPa | D 882 |
| TD | 39 | MPa | |
| Secant Modulus | | | |
| MD | 188 | MPa | D 882 |
| TD | 216 | MPa | |
| Recommended Melt Temperature Range | 205–245 | ° C. | |

TABLE 1

| Property | Unit | Test Method | Value |
|---|---|---|---|
| Volume flow index MVR at 260° C./2.16 kg | ml/10 min | ISO 1133 | 32 |
| Volume flow index MVR at HDT + 115° C./2.16 kg | ml/10 min | ISO 1133 | 2 |
| Density | g/cm$^3$ | ISO 1183 | 1.02 |
| Water absorption (24 h immersion in water at 23° C.) | % | ISO 62 | <0.01 |
| Water vapour permeability at 23° C. and 85% relative humidity | $\frac{g \cdot mm}{m^2 \cdot d}$ | DIN 53 122 | 0.023 |
| Mold shrinkage | | | 0.4–0.7 |
| Tensile strength | MPa | ISO 527 parts 1 and 2 | 63 |
| Elongation at break | % | Testing rate | 10 |
| Tensile modulus | MPa | 5 mm/min | 2600 |
| Impact strength (Charpy) | kJ/m$^2$ | ISO 179/1 eU | 20 |
| Notched impact strength (Charpy) | KJ/m$^2$ | ISO 179/1 eA | 2.6 |
| Ball indentation hardness, 30-sec value | N/mm$^2$ | ISO 2039 part 1, applied load 961 N | 130 |
| Glass transition temperature | ° C. | ISO 75 parts 1 and 2 | 75 |
| Coefficient of linear thermal expansion | ° C.$^{-1}$ | ISO 11359 parts 1 and 2 | $0.7 \cdot 10^{-4}$ |
| Relative permeability at 1–10 kHZ | | IEC 60250 | 2.35 |
| Comparative tracking index CTI | | IEC 60112 | >600 |
| Volume resistivity | Ohm · m | IEC 60093 | >10$^{14}$ |
| UL Flammability Rating | Class analogous | UL 94 | HB (1.6 mm) |
| Light transmission (2 mm wall thickness) | % | ASTM D 1003 | 92 |
| Melt temperature | | | >190° C.–<250° C. |

The compare examples and inventive examples are all three or five layer films, produced in a double-bubble shrink film manufacturing process (e.g. FIG. 2). Composition of examples are given in Table 5, Table 6, and Table 7. The examples of Table 5, have outer polyethylenic layers that are more than 80% LLDPE. In contrast, the examples of Tables 6 and 7 have polypropylenic outer layers comprising a polypropylene terpolymer (cataloid process), such as ethylene polypropylene butane terpolymer (Adsyl™ 5 from Basell).

Polypropylene terpolymer materials including the combination of properties provided in Table 3 below are particularly useful in various embodiments of the present invention.

TABLE 3

| Property | Method | Value Unit |
|---|---|---|
| Density | ASTM D 792 | 0.902 sp gr 23/23° C. |
| Melt flow rate(230° C./2.16 kg) | ASTM D 1238 | 5.50 g/10 min |
| Tensile Strength @ Yield | ASTM D 638 | 21.4 MPa |
| Flexural Modulus (1 mm/min, 1% Secant, Procedure A) | ASTM D 790 | 648 MPa |
| Tensile Elongation @ yld | ASTM D 638 | 13% |
| Notched izod impact (23° C., Method A) | ASTM D 256 | 85.4 J/m |
| Thermal DTUL @66 psi-Unannealed | ASTM D 648 | 62.8° C. |

Suitable EVA materials used in the examples include those having a melt flow rate ranging between 0.5 to 3.0 g/10 minutes at 190° C. and a density between 0.915 and 0.945 g/cc. Such EVA products are available from various vendors including products sold by AT Plastics such as 1807V, Dow Chemical (formerly Union Carbide), DuPont, Huntsman, Chevron, as well as others. EVA materials including the combination of properties provided in Table 4 below are particularly useful in various embodiments of the present invention.

TABLE 4

| Property | Typical Value | Unit | Test Method |
|---|---|---|---|
| Vinyl Acetate | 18 | % | AT Plastics PTM-39 |
| Melt Index | 0.7 | g/10 min | ASTM D1238 180/2.16 |
| Density | 940 | kg/m² | ASTM D1505 ASTM D1928 Proc A |
| DSC Melt Temperature | 85 | ° C. | ASTM D3417 |
| Tensile Strength: (MD/TD) | | | ASTM D882 MethodA (500 mm/min) |
| @Yield | 4/4 | MPa | |
| @Break | 27/27 | MPa | |
| Elongation | 42420/500 | % | |
| Dart Impact Strength (f50) | >750 | g/25 µm | ASTM D1709 |
| Vicat Softening Point | 61 | ° C. | ASTM D1525 |
| Haze | 11 | % | ASTM D1003 |
| 45° Gloss | 50 | | ASTM D2457 |

Suitable VLDPE materials used in the examples included those having a melt flow rate between 0.5 to 5.1 g/10 minutes at 190° C. and a density between 0.86 and 0.915 g/cc. Such VLDPE products are available from various vendors including products sold by Basell Polyolefins, Dow Chemical, Nova Chemicals, ExxonMobil Chemical, Mitsui Petrochemical, Sumitomo Chemical, as well as others. A particularly suitable VLDPE material is FP112-A sold by Nova Chemicals.

Films of the inventive example were deemed useful as high speed shrink film and relatively comparable to the compare films. Slightly higher haze was formed for film PP3. However, that is believed due to the trial run not properly purging the extruder between trials. The films were biaxially oriented to a thickness of 60 mils, although it is common to produce such films in thickness of 40 mils to 120 mils. Of particular interest is the superior hot slip quality of the inventive examples.

Films PE1, PE2, PE3, and PP1 were all produced as three layer shrink films. Films PP2, PP3, PP4, and PP5 were produced as five layer shrink films.

Hot slip rating was determined in the following manner. A package shrink wrap sealer was used to cover and seal video cassettes of the VHS format. The sealer temperature set point 170° C. Two video cassettes are collected for each film and then rubbed tapes together immediately after exiting the shrink tunnel. In this fashion slip is characterized at a temperature in excess of 50 to 60° Celsius. The results are then graded as follows: 1=film sticking; 3=film sliding but adhesion between packages noticeable; 5=free sliding.

TABLE 5

Polyethylenic Outer Layer

| Polyethylenic Outer Layers 2 Composition (30% total, approx. 15% each layer) | PE1 Compare Film Composition (wt %) | PE2 Compare Film Composition (wt %) | PE3 Inventive Film Composition (wt %) |
|---|---|---|---|
| Polyethylene (LLDPE) | 85 | 88.7 | 83.7 |
| EVA | 10 | 10 | 10 |
| Cyclic-olefin Copolymer (COC) | | | 5 |
| ABB242 (10% spherical silicone masterbatch in 90% LLDPE) | 3.7 | | |
| Silica Master Batch (10% silica in 90% LLDPE) | 1.3 | 1.3 | 1.3 |
| Innermost Layer 1 Composition (70%) | | | |
| Polyethylene (LLDPE) | 94 | 94 | 94 |
| Slip Master Batch (6.5% erucimide in 93.5% LLDPE) | 6 | 6 | 6 |
| Resultant Hot Slip Rating | 3.5 | 3.5 | 5 |

TABLE 6

Polypropylenic Outer Layer

| Polypropylenic Terpolymer Outer Layers 2 Composition (30% total, approx. 15% each layer) | PP1 Compare Film Composition (wt %) | PP2 Compare Film Composition (wt %) | PP3 Inventive Film Composition (wt %) (w/Topas 9506-04) |
|---|---|---|---|
| ethylene propylene butane terpolymer blend containing about 2% ultra high molecular weight silicone polymer | | 98% | |

TABLE 6-continued

Polypropylenic Outer Layer

| Polypropylenic Terpolymer Outer Layers 2 Composition (30% total, approx. 15% each layer) | PP1 Compare Film Composition (wt %) | PP2 Compare Film Composition (wt %) | PP3 Inventive Film Composition (wt %) (w/Topas 9506-04) |
|---|---|---|---|
| ethylene propylene butane terpolymer | 98.7 | | 88 |
| Cyclic-olefin Copolymer (COC) | | | 10 |
| AmpacetW210 (glass microspheres) | | 1.0 | 1.0 |
| Silica Master Batch (10% silica in 90% LLDPE) | 1.3 | 1.0 | 1.0 |
| Intermediate Inner Layers 3 Composition (when present 30% total, approx. 15% each layer)) | (3 layer) | 30% | 30% |
| Polyethylene (LLDPE) | | 38 | 38 |
| Polyethylene (VLDPE) | | 30 | 30 |
| EVA | | 30 | 30 |
| Slip Master Batch (6.5% erucimide in 93.5% LLDPE) | — | 2 | 2 |
| Innermost Layer 1 Composition | 70% | 40% | 40% |
| Polyethylene (LLDPE) | 97 | 57 | 57 |
| Polyethylene (VLDPE) | | 40 | 40 |
| Slip Master Batch (6.5% erucimide in 93.5% LLDPE) | 3 | 3 | 3 |
| Resultant Hot Slip Rating | 2 | 5 | 4.5 |

Inventive films may also be produced as a three layer film by combining the intermediate and core layers. However, when organic and inorganic fillers are to be incorporated, five layers are preferred. The compositions of two other five layered inventive films, PP4 and PP5, are provided in Tables 7 and 8 respectively. It should be noted that the compositions off PP4 and PP5 are similar, except that Ticona 9506 Topas™ was utilized in the composition of PP5 (as was the case for PP3) and Ticona 8007 Topas™ was utilized in the composition of PP4. The lower glass transition value of Ticona 9506 Topas™ provides a lower hot slip rating. Accordingly, the resultant hot slip rating for PP4 is 5, while the resultant hot slip rating for PP5 is 4.5.

As indicated in Tables 9-11 below, films of the inventive examples have significantly improved final properties.

TABLE 9

| | PE1 Compare Film | PE3 Inventive Film |
|---|---|---|
| Gauge (mils) | 0.45 | 0.45 |
| Haze (%) | 3.5 | 4.3 |
| Gloss | 133 | 134 |
| COF (kinetic) (KI) | 0.17 | 0.13 |

TABLE 7

Polypropylenic Outer Layer

| Skin Layer | Core Layer | Tie Layer |
|---|---|---|
| 62–88% (preferably 73%) PP<br>2–8% (preferably 5%) Slip<br>10–30% (preferably 22%) Anti-Block (Ticona Topas 8007) | 0–70% (preferably 54.5%) LLDPE<br>30–98% (preferably 40%) VLDPE<br>2–8% (preferably 5.5%) Slip | 0–35% (preferably 25%) LLDPE<br>20–70% (preferably 40%) VLDPE<br>15–50% (preferably 30%) EVA<br>2–8% (preferably 5%) Slip |

TABLE 8

Polypropylenic Outer Layer

| Skin Layer | Core Layer | Tie Layer |
|---|---|---|
| 62–88% (preferably 73%) PP<br>2–8% (preferably 5%) Slip<br>10–30% (preferably 22%) Anti-Block (Ticona Topas 9506) | 0–70% (preferably 54.5%) LLDPE<br>30–98% (preferably 40%) VLDPE<br>2–8% (preferably 5.5%) Slip | 0–35% (preferably 25%) LLDPE<br>20–70% (preferably 40%) VLDPE<br>15–50% (preferably 30%) EVA<br>2–8% (preferably 5%) Slip |

TABLE 9-continued

|  | PE1 Compare Film | PE3 Inventive Film |
|---|---|---|
| Tensile Strength (kpsi) | | |
| (MD) | 19.0 | 17.0 |
| (TD) | 20.0 | 17.0 |
| Elongation at break | | |
| (MD) | 118% | 111% |
| (TD) | 170% | 142% |
| Modulus of Elasticity (kpsi) | | |
| (MD) | 39 | 41.1 |
| (TD) | 46.0 | 52.8 |
| Tear Strength (g) | | |
| (MD) | 5.7 | 5.4 |
| (TD) | 5.2 | 7.5 |
| Oven Shrinkage | | |
| (MD) | 58% | 58% |
| (TD) | 61% | 60% |
| Water Shrinkage | | |
| (MD) | 12% | 16% |
| (TD) | 24% | 22% |

TABLE 10

|  | PE1 Compare Film | PE3 Inventive Film |
|---|---|---|
| Gauge (mils) | 0.60 | 0.60 |
| Haze (%) | 4.1 | 4.0 |
| Gloss | 125 | 122 |
| COF (kinetic) (KI) | 0.15 | 0.14 |
| Tensile Strength (kpsi) | | |
| (MD) | 19.0 | 16.0 |
| (TD) | 18.0 | 19.0 |
| Elongation at break | | |
| (MD) | 112% | 116% |
| (TD) | 127% | 168% |
| Modulus of Elasticity (kpsi) | | |
| (MD) | 43 | 37.4 |
| (TD) | 49.0 | 49.8 |
| Tear Strength (g) | | |
| (MD) | 8.0 | 18.4 |
| (TD) | 9.0 | 18.3 |
| Oven Shrinkage | | |
| (MD) | 61% | 60% |
| (TD) | 65% | 61% |
| Water Shrinkage | | |
| (MD) | 8% | 12% |
| (TD) | 13% | 23% |

TABLE 11

|  | PP1 Compare Film | PP2 Compare Film | PP3 Inventive Film | PP4 Inventive Film | PP5 Inventive Film |
|---|---|---|---|---|---|
| Gauge (mils) | 0.75 | 0.60 | 0.6 | 0.6 | 0.6 |
| Haze (%) | 3.7 | 4.0 | 4.1 | 2.9 | 2.0 |
| Gloss | 129 | 113 | 113 | 108 | 101 |
| COF (kinetic) (KI) | | 0.16 | | 0.22 | |
| Tensile Strength (kpsi) | | | | | |
| (MD) | 16.0 | 18 | 19 | 18.0 | 64.0 |
| (TD) | 16.0 | 15 | 17 | 17.0 | 54.0 |
| Elongation at break | | | | | |
| (MD) | 115% | 123% | 130% | 102% | 106% |
| (TD) | 119% | 110% | 152% | 150% | 129% |
| Modulus of Elasticity (kpsi) | | | | | |
| (MD) | 48 | 37.0 | 51 | 43.0 | 76.0 |
| (TD) | 52 | 38 | 62 | 42.0 | 79.0 |
| Tear Strength (g) | | | | | |
| (MD) | | | | | |
| (TD) | | | | | |
| Oven Shrinkage | | | | | |
| (MD) | 44.0 | 58 | 52 | 60% | 55% |
| (TD) | 48.0 | 60 | 54 | 63% | 57% |
| Water Shrinkage | | | | | |
| (MD) | 16 | 21 | | 24% | 31% |
| (TD) | 16 | 31 | | 33% | 39% |

The lower glass transition value of Ticona 9506 Topas™ is thought to account for the better water shrinkage of PP5 when compared to PP4.

Films of inventive example using polyethylene polymers in an outermost layer have been successfully crosslinked using a radiation source situated after the second bubble of the double-bubble biaxial orientation process with no visual defects noticed.

The present invention may further comprise additives directed at improving the processability or final properties of the film. Such additives include antifog, slip enhancers, anti-block agents, combined slip and anti-block additives, ultraviolet light inhibitors and absorbers. For example, slip and antiblock additives amount to approximately 5% by weight of the example films.

Antifogging or antistatic agents can be added to the films and sheets of the present invention to increase surface conductivity and prevention of water droplet formation and attraction of dust and dirt on the film surface. These antifogging agents include, but are not limited to, glycerol mono-stearate, glycerol mono-oleate, lauric diphthalamides, ethoxylated amines, ethoxylated esters, and other additives known in the industry. When used, they may be present in amounts as high as 15% by weight of the outer film layer.

Other additives and processing aids may be added and include, for example, antioxidants (e.g., hindered phenols such as, for example, Irganox® 1010, and phosphites, e.g., Irgafos® 168, (both are registered trademarks of, and supplied by Ciba-Geigy Corporation, NY), U.V. stabilizers (including Tinuvine® 328 and Chimassorb® 944, both are registered trademarks of, and supplied by Ciba-Geigy Corporation, NY, Ampacet Corporation UV100, based on Ciba Specialty Chemical's proprietary Shelfplus®), flame retardant agents (available from A. Schulman of Akron, Ohio, Clariant of Easton, Md. and Technical Polymer Representatives of Amherst, Ohio), cling additives (e.g., polyisobutylene), slip agents (erucamide, such as Ingenia 1065, and/or stearamide), antiblock additives, printable additives, A. Schulman paper match additives, polar additives, colorants, and pigments, to the extent that such additives do not interfere with the shrink and adhesive properties of the films.

Exemplary classes of oils useful as processing aids include white mineral oil (such as Kaydol® oil (available from Witco), and Shellflex® 371 naphthenic oil (available from Shell Oil Company). Another suitable oil is Tuflo® oil (available from Lyondell).

Tackifiers can also be added to the polymer compositions used to prepare the films or sheets of the present invention in order to alter the glass transition temperature ($T_g$) and thus extend the available application temperature window of the film. Examples of the various classes of tackifiers include, but are not limited to, aliphatic resins, polyterpene resins, hydrogenated resins, pure monomer hydrocarbon resin, styrene/α-methylene styrene resins, mixed aliphatic-aromatic resins, hydrogenated pure monomer hydrocarbon resin, modified styrene copolymers, pure aromatic monomer copolymers, and hydrogenated aliphatic hydrocarbon resins. Examples of aliphatic resins include those available under the trade designations Escorez®), Piccotac®, Mercures®, Wingtack®, Hi-Rez®. Quintone®, Tackirol®, etc. Examples of polyterpene resins include those available under the trade designations Nirez®, Piccolyte®, Wingtack®, Zonarez®, etc. Exemplary hydrogenated resins include those available under the trade designations Escorez®, Arkon®, Clearon®, etc. Examples of mixed aliphatic-aromatic resins include those available under the trade designations Escorez®, Regalite®, Hercures®, AR®, Imprez®, Norsolene®, M, Marukarez®, Arkon®, M, Quintone®), Wingtack®, etc. Particularly preferred classes of tackifiers include the styrene/α-methylene styrene tackifiers available from Hercules and styrene/α-methyl styrene tackifiers such as Wingtack® 86, Hercotac® 1149, Eastman H-130, and the like.

Also included as a potential component of the polymer compositions used in the present invention are various organic and inorganic fillers, the identity of which depends upon the type of application for which the elastic film is to be utilized. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, $B_2O_3$, nickel powder or chalk.

Finally, as discussed above, crosslinking may be performed on the shrink films, either at the collapsed tube or at the fully oriented film stages of the double-bubble process. Crosslinking may be desirable for films to be used in packaging lines operating at higher temperatures or where greater inter-layer adhesion is needed.

Although the present invention has been described in terms of specific embodiments, various substitutions of materials and conditions can be made as will be known to those skilled in the art. For example, single site catalyzed LLDPE (e.g. metallocene catalyzed LLDPE) may replace LLDPE for processing to thinner gauges. Other variations will be apparent to those skilled in the art and are meant to be included herein. The scope of the invention is only to be limited by the following claims.

What is claimed is:

1. A multilayer shrink film for high speed packaging lines having a modulus of 40,000 psi or higher and a haze value less than 5.0 comprising:
    a first outer high speed polyethylenic layer;
    a second outer high speed polyethylenic layer;
    at least one inner polyethylenic layers;
    wherein each outer high speed polyethylenic layer comprises by weight 60% to 85% linear low density polyethylene, 5% to 15% ethylene vinyl acetate copolymer and 3% to 15% cyclic-olefin copolymer;
    wherein the cyclic-olefin copolymer of the multilayer shrink film is a single-site catalyzed cyclic-olefin copolymer;
    wherein the cyclic-olefin copolymer forms from 1% to 4.5% of the total weight of the multilayer shrink film;
    wherein the multilayer shrink film comprises less than 1% by weight polystyrene and less than 1% polypropylene;
    wherein the polyethylenic layers have substantially silicone free surfaces; and
    wherein the multilayer shrink film has a hot slip rating of 4.5 or higher.

2. The film of claim 1 wherein the linear low density polyethylene copolymer comprises 1 to 10 weight percent 1-octene monomer.

3. The film of claim 1 having a thickness between 0.4 and 3.0 mils.

4. The film of claim 1 wherein the first outer high speed polyethylenic layer forms from 5% to 20% of the total weight of the film and wherein the second outer high speed polyethylenic layer forms from 5% to 20% of the total weight of the film.

5. The film of claim 1 crosslinked using a radiation source.

6. The film of claim 5 wherein the radiation source is active on the first collapsed tube of a double-bubble film orientation process.

7. The film of claim 5 wherein the radiation source is active on the film subsequent to full biaxial orientation.

8. The multi-layer shrink film of claim 1, further comprising first and second intermediate polyethylenic layers.

9. A multilayer shrink film for high speed packaging lines having a modulus of 40,000 psi or higher a haze value less than 5.0 and superior hot slip comprising:
    a first outer high speed polypropylenic layer;
    a second outer high speed polypropylenic layer;
    at least one inner polyethylenic layers;
    wherein each of the polypropylenic layers comprises by weight 70% to 96% polypropylene and 4% to 30% cyclic-olefin copolymer;
    wherein the cyclic-olefin copolymer of the multilayer shrink film is a single-site catalyzed cyclic-olefin copolymer;
    wherein the cyclic-olefin copolymer forms from 1% to 4.5% of the total weight of the multi-layer shrink film;
    wherein the high speed polypropylenic layers have substantially silicone free surfaces; and
    wherein the multilayer shrink film has a hot slip rating of 4.5 or higher.

10. The film of claim 9 having a thickness between 0.4 and 2.0 mils.

11. The film of claim 9 wherein the first outer polypropylenic layer forms from 5% to 20% of the total weight of the film and wherein the second outer polypropylenic layer forms from 5% to 20% of the total weight of the film.

12. The multi-layer shrink film of claim 9, further comprising first and second intermediate polyethylenic layers.

13. The multi-layer shrink film of claim 12, wherein:
the first and second outer high speed polypropylenic layers comprise by weight 88% polypropylenic polymer, 10% cyclic-olefin copolymer, and 1% slip master batch;
the at least one inner layer comprises 57% linear low density polyethylene, 40% very low density polyethylene, and 3% slip master batch;
the first and second intermediate polyethylenic layers comprise 38% linear low density polyethylene, 30% very low density polyethylene, 30% ethylene vinyl acetate copolymer, and 2% slip master batch.

14. A multilayer shrink film for high speed packaging lines comprising:
first and second skin layers, said skin layers comprising by weight 62-88% polypropylenic polymer, 2-8% slip agent, and 10-30% cyclic-olefin copolymer;
a core layer, said core layer comprising by weight 0-70% linear low density polyethylene, 30-98% very low density polyethylene, and 2-8% slip agent; and
first and second tie layers, said tie layers comprising by weight 0-35% linear low density polyethylene, 20-70% very low density polyethylene, 15-50% ethylene vinyl acetate copolymer, and 2-8% slip agent;
wherein the multilayer shrink film has a hot slip rating of 4.5 or higher;
wherein the multilayer shrink film has a modulus of at least 40,000 psi; and
wherein the multilayer shrink film has a haze value less than 5.0.

15. The multi-layer shrink film of claim 14, wherein the cyclic olefin co-polymer has a glass transition temperature of 75° C.

16. The multi-layer shrink film of claim 14, wherein:
said skin layer comprises by weight 70-75% polypropylenic polymer, 4-6% slip agent, and 20-24% cyclic-olefin copolymer;
said core layer comprises by weight 50-60% linear low density polyethylene, 36-44% very low density polyethylene, and 4-6% slip agent; and
said tie layer comprises by weight 22-28% linear low density polyethylene, 36-44% very low density polyethylene, 30% ethylene vinyl acetate copolymer, and 4-6% slip agent.

17. The multilayer shrink film of claim 14, wherein the skin layer comprises 73% polypropylenic polymer, 5% slip agent, and 22% cyclic-olefin copolymer.

18. The multilayer shrink film of claim 14, wherein the core layer comprises 54.5% linear low density polyethylene, 40% very low density polyethylene, and 5.5% slip agent.

19. The multilayer shrink film of claim 14, wherein the tie layer comprises 25% linear low density polyethylene, 40% very low density polyethylene, 30% ethylene vinyl acetate copolymer, and 5% slip agent.

20. A multilayer shrink film for high speed packaging lines having a modulus of 40,000 psi or higher and a haze value less than 5.0 comprising:
first and second outer high speed polyethylenic layers comprising by weight 80-86% linear low density polyethylene, 8-12% ethylene vinyl acetate copolymer, 4-6% cyclic-olefin copolymer, and 1.0-1.4% silica master batch, said silica master batch including 10% silica in 90% LLDPE; and
at least one inner polyethylenic layer comprising by weight 92-98% linear low density polyethylene and 2-8% slip master batch, said slip master batch including 6.5% erucimide in 93.5% LLDPE;
wherein the cyclic-olefin copolymer of the multilayer shrink film is a single-site catalyzed cyclic-olefin copolymer;
wherein the cyclic-olefin copolymer forms from 1% to 4.5% of the total weight of the multi-layer shrink film;
wherein the multi-layer shrink film comprises less than 1% by weight polystyrene and less than 1% polypropylene;
wherein the polyethylenic layers have substantially silicone free surfaces; and
wherein the multilayer shrink film has a hot slip rating of 4.5 or higher.

21. The multi-layer shrink film of claim 20, wherein:
said high speed polyethylenic layers comprise by weight 83.7% linear low density polyethylene, 10% ethylene vinyl acetate copolymer, 5% cyclic-olefin copolymer, and 1.3% silica master batch; and
said at least one inner polyethylenic layers comprises by weight 94% linear low density polyethylene and 6% slip master batch.

\* \* \* \* \*